US011414828B2

(12) United States Patent
Hull

(10) Patent No.: US 11,414,828 B2
(45) Date of Patent: Aug. 16, 2022

(54) USE OF COMPOSITE PARTICLES FOR PROTECTING A LIFELINE STRUCTURE AGAINST SEISMIC WAVE DAMAGE

(71) Applicant: Aquablok, LTD., Swanton, OH (US)

(72) Inventor: John H. Hull, Ottawa Hills, OH (US)

(73) Assignee: Aquablok, LTD., Swanton, OH (US)

( * ) Notice: Subject to any disclaimer, the term of this patent is extended or adjusted under 35 U.S.C. 154(b) by 0 days.

(21) Appl. No.: 16/328,479

(22) PCT Filed: Sep. 1, 2017

(86) PCT No.: PCT/US2017/049801
§ 371 (c)(1),
(2) Date: Feb. 26, 2019

(87) PCT Pub. No.: WO2018/045257
PCT Pub. Date: Mar. 8, 2018

(65) Prior Publication Data
US 2019/0194069 A1 Jun. 27, 2019

Related U.S. Application Data

(60) Provisional application No. 62/382,463, filed on Sep. 1, 2016.

(51) Int. Cl.
*E02D 27/34* (2006.01)
*E02B 3/10* (2006.01)
*E02D 17/18* (2006.01)

(52) U.S. Cl.
CPC ............. *E02D 27/34* (2013.01); *E02B 3/10* (2013.01); *E02D 17/18* (2013.01)

(58) Field of Classification Search
CPC .................................................. E21D 27/34
See application file for complete search history.

(56) References Cited

U.S. PATENT DOCUMENTS 3,952,529 A 4/1976 Lefever
4,266,885 A * 5/1981 Naito .................. E02B 7/06
405/109

(Continued)

FOREIGN PATENT DOCUMENTS

WO 2016014199 A1 1/2016

OTHER PUBLICATIONS

Chilean Office Action, Application No. 201900515, dated Apr. 3, 2020.

(Continued)

*Primary Examiner* — Janine M Kreck
(74) *Attorney, Agent, or Firm* — MacMillan, Sobanski & Todd, LLC

(57) ABSTRACT

Composite particles of a hard core coated by a layer of hydratable, swellable clay such as bentonite are useful for constructing, modifying and/or supporting lifeline structure such as dams, berms and levees, and/or pipelines or conduits for oil, gas, sewage, water, or cables or wires for transmission of electrical power or data information. The method involves placing the composite particles in a location within, below, or about the lifeline structure, and hydrating them to cause them to swell and fill and seal the voids around the structure to form a resilient support having a high damping ratio and low hydraulic conductivity that is maintained after exposure to strain forces. The composite particles are advantageous in damping seismic waves and reducing the potential damage from an earthquake, explosion, tremor, fatigue loading, or similar seismic event.

14 Claims, 10 Drawing Sheets

(56) References Cited

U.S. PATENT DOCUMENTS

| | | | | |
|---|---|---|---|---|
| 5,246,312 | A | * | 9/1993 | Taki ........................ E02D 19/18 |
| | | | | 405/129.75 |
| 5,454,668 | A | | 10/1995 | Liao |
| 6,386,796 | B1 | * | 5/2002 | Hull .......................... B09C 1/00 |
| | | | | 405/128.1 |
| 2002/0150429 | A1 | | 10/2002 | Hull |
| 2008/0032901 | A1 | * | 2/2008 | Hull ........................ E21B 33/10 |
| | | | | 507/201 |
| 2010/0278594 | A1 | * | 11/2010 | Sheridan ................. E02B 3/122 |
| | | | | 405/270 |
| 2013/0196061 | A1 | | 8/2013 | Hull |

OTHER PUBLICATIONS

European Extended Search Report, Application No. 17847604.0, dated Mar. 27, 2020.
Australian Examination report, Application No. 2017321804, dated Apr. 30, 2021.
PCT International Search Report and Written Opinion, Application No. PCT/US2017/049801, dated Nov. 8, 2017.
Australian Examination report, Application No. 2017321804, dated Oct. 18, 2021.

* cited by examiner

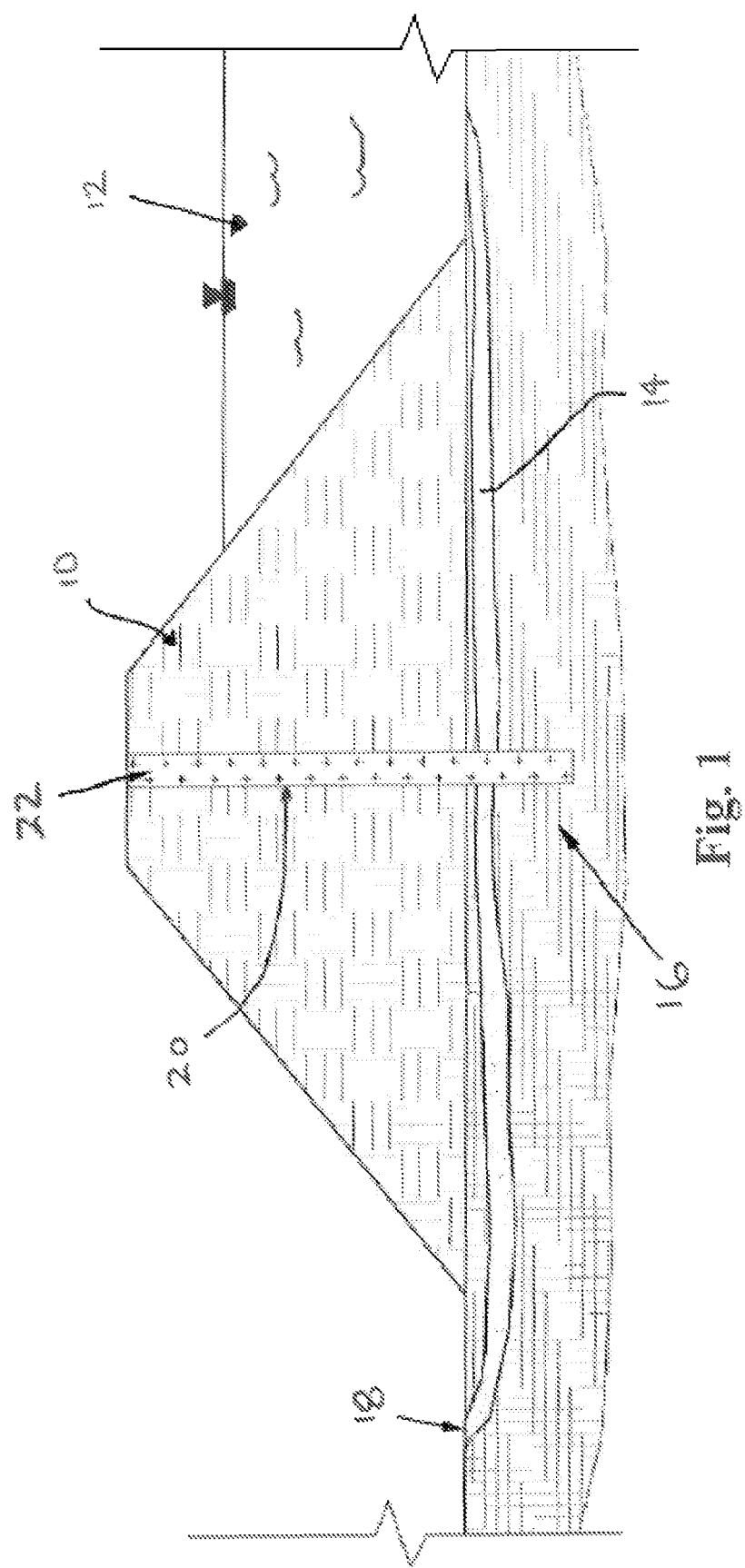

USE OF COMPOSITE PARTICLES FOR PROTECTING A LIFELINE STRUCTURE AGAINST SEISMIC WAVE DAMAGE

CROSS-REFERENCE TO RELATED APPLICATIONS

This application is the National Phase of International Application PCT/US2017/049801 filed Sep. 1, 2017, which designated the U.S. That International Application was published in English under PCT Article 21(2) on Mar. 8, 2018 as International Publication Number WO 2018/045257A1. PCT/US2017/049801 claims priority to U.S. Provisional Application For Patent No. 62/382,463 filed Sep. 1, 2016. Thus, the subject nonprovisional application also claims priority to U.S. Provisional Application For Patent No. 62/382,463 filed Sep. 1, 2016. The disclosures of all of these applications are incorporated herein by reference.

BACKGROUND OF THE INVENTION

This invention generally relates to materials and methods for damping seismic vibrations and, in particular, methods for protecting lifeline systems like dams, levees, oil and gas pipelines, bridge abutments, tunnels and aqueducts using composite particles.

Earthquakes are generally caused by shifts of one plate or land mass against another along a fault line or in a fault zone. These land shifts generate large, low frequency vibrational energies known as seismic waves, which can do great damage to structures that are not engineered to withstand these vibrational oscillations. Volcanic eruptions, large landslides and even some man-made explosions can cause similar seismic waves that travel through the earth's crust.

A 1991 FEMA Report on the vulnerability of U.S. lifelines to seismic disruptions analyzed and reported on the various economic losses that would result if various lifelines in seven selected regions of the U.S. were disrupted by earthquakes typical for those regions. The direct damage losses ranges from $1.5 billion to $11.8 billion in 1991 dollars, depending on the region (Executive Summary, pg. xxvi). Lifelines were defined as systems—such as those for delivery of food, fuel, water, electrical power, information, etc.—that are necessary for human life an urban function. Lifelines thus include transportation systems, such as highways, railways, airports and harbor ports; energy systems, such as electrical power transmission lines and gas and oil pipelines; emergency services, such as hospitals and broadcast systems; and water delivery systems, such as aqueducts, reservoirs and pipelines (Executive Summary pg. xvii).

Composite particles comprise a core, such as aggregate or other material, coated with a hydratable sealant layer, such as a bentonite clay layer. These composite particles have been described in the patent literature; see, e.g. U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, and U.S. Pat. No. 7,438,500, which issued to Hull on Oct. 21, 2008, each of which is incorporated herein by reference in their entirety. Such composite particles provide a structurally sound base resulting from the level of aggregate as well as varying degrees of water permeability and cohesive properties, depending on the composition and amount of the hydratable sealant layer component. Some uses of these composite particles have included land fill barrier layers, sediment capping systems, environmental zone segregation such as for oil spills or river and stream bed protections, and trench dams.

In particular, U.S. Pat. Nos. 6,386,796 and 6,558,081, both to Hull, describe at FIG. 9 and description thereof, surrounding a pipe with hydratable composite particles that have residual expansion or swelling capacity that can stabilize and seal the pipe against leakage. These patents also describe at FIG. 12 and description thereof, placing hydratable composite particles at the bottom of a pond, reservoir, or other body of water retained by a dam or levee 86. Such use may prevent leakage through a sand seam below the body of water.

The present invention seeks to address problems of damage to lifeline structures resulting from seismic waves such as might originate from an earthquake, volcanic action, or other forms of fatigue loading, including repetitive vehicular traffic that may cause cyclic loading and unloading akin to the strain of seismic waves. The present invention is particularly suited to linear lifeline structures like rails and pipelines, and to geotechnical installations, such as dams, levees, waste containment berms, bridge abutments and the like.

SUMMARY OF THE INVENTION

In an aspect of the invention, a method involves protecting a lifeline structure, such as a pipeline or dam, levee or berm from damage caused by seismic waves, the method comprising:

providing a plurality of composite particles, the composite particles having a hard core at least partially coated with a sealant layer of hydratable clay material that swells upon hydration;

using the composite particles to protect the lifeline structure from damage caused by seismic waves by one or more of (1) constructing or modifying the lifeline structure using the composite particles integrated into structure; or (2) supporting the lifeline structure at at least one location using the composite particles;

hydrating the hydrating the clay material to cause it to swell and seal voids; and optionally, covering the composite particles with earthen backfill.

An example application would be the use of the material to construct critical permeability structures such as keyways in dams and levees that, if constructed of traditional clayey soils or concrete, could become fractured by seismic stresses, or even from extreme loads carried over such dams and levels on highways or railways. Another example would be the use of such composite particles to support a pipeline continuously or periodically with support structures that support the pipeline via a damping, isolation base to reduce the risk or damage by shear fracture.

In certain embodiments, the damping ratio of the hydrated composite particles ranges from about 20% to about 65% at a strain of 0.1%, and from about 25% to about 60% at a strain of 1.0%. In certain embodiments, the damping ratio of the hydrated composite particles is relatively constant such that it ranges from about 35% to about 60% at a strain of 0.1% and at a strain of 1.0%, or even at higher strains. These damping ratios are contrasted with those of natural soils or coarse bedding materials that would typically be used for pipeline installations or those of clayey soils used in dam or levee installations.

In some embodiments, the core of the composite particle is an aggregate having an angular or subangular shape, such as having an angularity of from 5 to 12, or from 7 to 10. In some embodiments, that sealant layer comprises a high quality bentonite, which accounts for between about 20 to about 40 wt % of the composite particle.

In certain embodiments, the hydraulic conductivity (K) of the hydrated composite particles is very low; for example $1\times10^{-5}$ cm/sec or less, $1\times10^{-6}$ cm/sec or less, $1\times10^{-7}$ cm/sec or less, etc. and maintains this low permeability even after being stressed at a strain as high as 1.0% or even higher, over many cycles of applied strain.

BRIEF DESCRIPTION OF THE DRAWINGS

FIG. 1 is a cross-sectional illustration of use of the composite particles of the invention in a cut-off wall application, such as in a dam, berm or levee.

DETAILED DESCRIPTION OF THE INVENTION

Figure 2A:
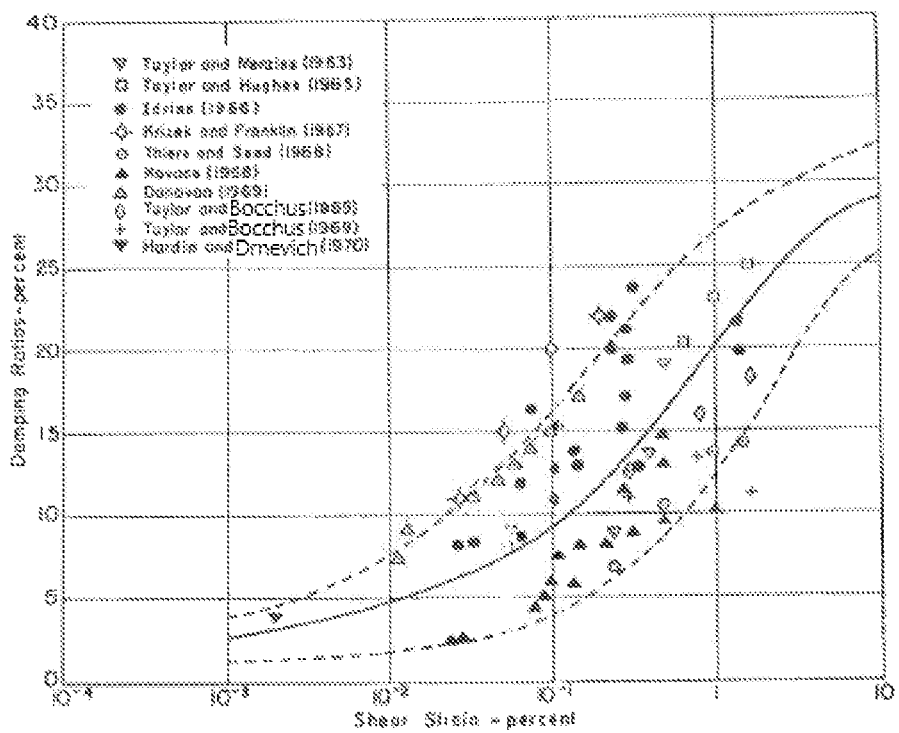
FIGS. 2A and 2B are charts reproduced from literature showing comparative damping ratios and shear modulus values for clayey muds.

As used in this disclosure, certain acronyms and terms have the meanings ascribed below. The term "AB" means AquaBlok®, one example of a composite particle having a core and hydratable layer that can form an impermeable layer of a barrier or capping system. The term "RB" means RockBlok™, a blend of rock, sand, and AquaBlok particles, but one which generally is used to form a permeable layer of a barrier system. The term "BB" means Blended Barrier™, which is a blend of an AquaBlok® impermeable barrier and additional, uncoated aggregate rock.

Where a closed or open-ended numerical range is described herein, all values and subranges within or encompassed by the numerical range are to be considered as being specifically included in and belonging to the original disclosure of the present application as if these values and subranges had been explicitly written out in their entirety. The upper and lower limits of all numerical ranges are deemed to be preceded by the modifier "about."

All patent applications, patent application publications, patents, scientific and technological literature, publications and references specifically mentioned herein are incorporated herein by reference in their entirety.

Composite Particles

The composite particles used in AB, AB/RB, or AB/BB sediment capping systems are known and described in the art along with various specific embodiments and/or sediment capping systems containing the same. See for reference U.S. Pat. No. 5,538,787, which issued to Nachtman et al. on Jul. 23, 1996, U.S. Pat. No. 5,897,946, which issued to Nachtman et al. on Apr. 27, 1999, U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, U.S. Pat. No. 7,438,500, which issued to Hull on Oct. 21, 2008, and WO 2012/048215 published Apr. 12, 2012, each of which is incorporated herein by reference in their entirety. The particles may have any desired particle diameter, non-limiting examples of which include composite particles having a particle diameter of less than ¾ inches (~20 mm), including ¼-¾ inches (~5 mm to ~20 mm), and ¼-⅜ inches (~5 mm to ~10 mm).

The core of the composite particles may include a granular piece of stone, rock, gravel, sand, or slag, non-limiting examples of which include a granular piece of crushed limestone or other chemically/physically stable earthen aggregate. The core may have any desired particle diameter, a non-limiting example of which includes a particle diameter of ¼-⅜ inches (~5 mm to ~10 mm). The core may be more dense, less dense or equally as dense as the sealant layer. In an exemplary embodiment, the core has a relatively greater density as compared to that of the sealant layer.

In addition to grading by size, aggregate may be graded by its shape. In a gross sense, aggregate is considered to be round, sub-round, sub-angular, angular or flaky, progressing from sphere-like to very irregular and jagged shapes. In an attempt to quantify this, engineers have developed an angularity number. When small spheres are compacted into a specific larger volume, 67% is occupied by the spheres and 33% is void space. When irregularly shaped aggregate is similarly compacted, the % void space will increase in proportion to the angularity. Thus, the Angularity number of an aggregate is the amount (to the higher whole number) by which the percentage of voids in it after compacting in a prescribed manner exceeds 33. The value of angularity number generally lies between 0 and 11.

It has been shown that angular particles with a rough surface texture can create a very strong matrix, but can also be very difficult to compact since the rough surface textures and angular particles can interlock together and resist compactive effort. In contrast, rounded particles with smooth surface texture will compact more readily, but will be unstable under load since the particles will displace and slide against each other. Accordingly, in road construction angularity number of 7-10 is generally preferred. In the present invention angularity numbers ranging from 5 to 12, or from 7-10 are also preferred for seismic damping.

The sealant layer of the composite particles may partially or completely encapsulate the core. The sealant layer comprises a hydratable material, non-limiting examples of which include a clay, a water absorbent clay that is readily hydratable and has a high swelling capacity (e.g., a bentonite clay, such as high quality Wyoming-derived sodium bentonite clay containing montmorillonite), a clay mineral (e.g., montmorillonite, illite, kaolinite, and attapulgite), and combinations thereof.

When composite particles having a sealant layer of water absorbent clay are exposed to water, the clay readily hydrates and swells to form a continuous seal or barrier layer having extremely low or no water permeability, which is effective for preventing migration, or avoiding leakage, of sediment, groundwater, gas, and/or contaminants there through. The resultant seal or barrier layer may have any desired thickness, a non-limiting example of which includes a seal or barrier layer having a thickness of about 1 to about 4 inches (~2.5 to 10 cm) and up to 6 feet (2 meters). However, unlike silty clay soils typically used in dam or levee barrier installations, composite particles are resistant to liquefaction upon exposure to cyclic vibrational forces that would otherwise compromise a typical soil barrier.

The composite particles may have any desired weight percent ratio of sealant layer to core, based on a total weight of the composite particles, non-limiting examples of which include:

| Sealant layer (wt %) | Core (wt %) |
|---|---|
| 5 | 95 |
| 10 | 90 |
| 15 | 85 |
| 20 | 80 |
| 25 | 75 |
| 30 | 70 |
| 35 | 65 |
| 40 | 60 |
| 45 | 55 |
| 50 | 50 |

The composite particles may have any desired dry bulk density, non-limiting examples of which include a dry bulk density of 70-90 lbs/ft$^3$, (i.e. about 1121 to 1442 kg/m$^3$) including 88-90 lbs/ft$^3$ (i.e. about 1410 to 1442 kg/m$^3$) consolidated, and 83-85 lbs/ft$^3$ (i.e. about 1329 to 1362 kg/m$^3$) unconsolidated. The composite particles may have a specific gravity of greater than 1.0.

The composite particles may, depending on use, have any desired water permeability or hydraulic conductivity. Permeability or "hydraulic conductivity" (K) is measured in rates of flow (e.g. cm/sec). In certain embodiments described herein, the barrier layer after hydration will have a very low conductivity or be "substantially impermeable"; i.e. having a hydraulic conductivity (K) of $1\times10^{-5}$ cm/sec or less, for example, $1\times10^{-6}$ cm/sec or less, $1\times10^{-7}$ cm/sec or less, $1\times10^{-8}$ cm/sec or less, $1\times10^{-9}$ cm/sec, or having a conductivity in the range from $1\times10^{-5}$ to $1\times10^{-9}$ cm/sec, from $1\times10^{-6}$ to $1\times10^{-9}$ cm/sec, from $1\times10^{-5}$ to $1\times10^{-8}$ cm/sec, from $1\times10^{-6}$ to $1\times10^{-8}$ cm/sec, from $1\times10^{-5}$ to $1\times10^{-8}$ cm/sec, etc. or lower.

The composite particles may further comprise one or more binders to promote adhesion of the sealant layer to the core. A non-limiting example of the binder includes a cellulosic polymer. The composite particles may further comprise one or more additional layers containing one or more desired materials and having any desired thickness. For example, the particle may contain fibrous materials in one or more layers, or protective outer coatings designed to facilitate transport.

The composite particles referenced and described above can of course be custom-formulated to meet unique site-specific demands for a particular project. For example, specific attention to design formulations may be necessary in order to create a block to prohibit the migration of pore waters and pore fluids, which can lead to piping of fine soils and ultimate failure of a containment structure. Accordingly, the foregoing discussion regarding the composite particles is for illustrative purposes only and not intended to be limited to the specific aspects exemplified herein, but is to be accorded the broadest reasonable scope consistent with the general principles and features referenced and disclosed herein.

AB, BB, and RB composite particles may be characterized by a formulation that emphasizes a high swelling clay reactive material so as to create an extremely low permeability cap or impermeable cap with a hydraulic conductivity (K) of $1\times10^{-7}$ cm/sec or less or $1\times10^{-8}$ cm/sec or less, including from $1\times10^{-7}$ to $1\times10^{-9}$ cm/sec or lower when subjected to mechanical compaction.

The dense, granular nature of the composite particles enables them to be easily and uniformly deployed and deposited through a water column (via Stoke's law) and onto the sediment surface using conventional materials handling equipment. AB composite particles may be used alone to form an AB passive impermeable barrier layer or blended with other aggregate materials to form a BB barrier layer or RB barrier layer.

Selected Lifeline Applications and Uses of AB Composite Particles

A number of lifeline structures may be considered linear in nature. Pipelines and rail lines are examples. The traditional construction method of supporting a pipeline on an aggregate bed in a trench leaves the pipeline vulnerable to shear failure in the face of a seismic event. This is particularly true of pipelines embedded in trenches in rocky areas. As the seismic vibrations traverse the crust, shifting of the supporting soil or rock can apply stress or strain to the pipeline and may cause it to fracture, shear or otherwise fail. Even in prior applications where composite particles have been used with entrenched pipelines, only a thin layer was disposed beneath the pipe; just enough to maintain the desired grade and to provide a sealant layer against any leaks.

When used in sufficient thickness, the composite particles according to the invention have a high damping ratio and are able to absorb and/or deflect the energy of seismic waves that may cause such damage. Supporting the pipeline, roadway, abutment, or rail line instead on a bed of such composite particles has an improved ability to absorb seismic wave energy and reduce damage to linear lifeline structures.

Figure 8:
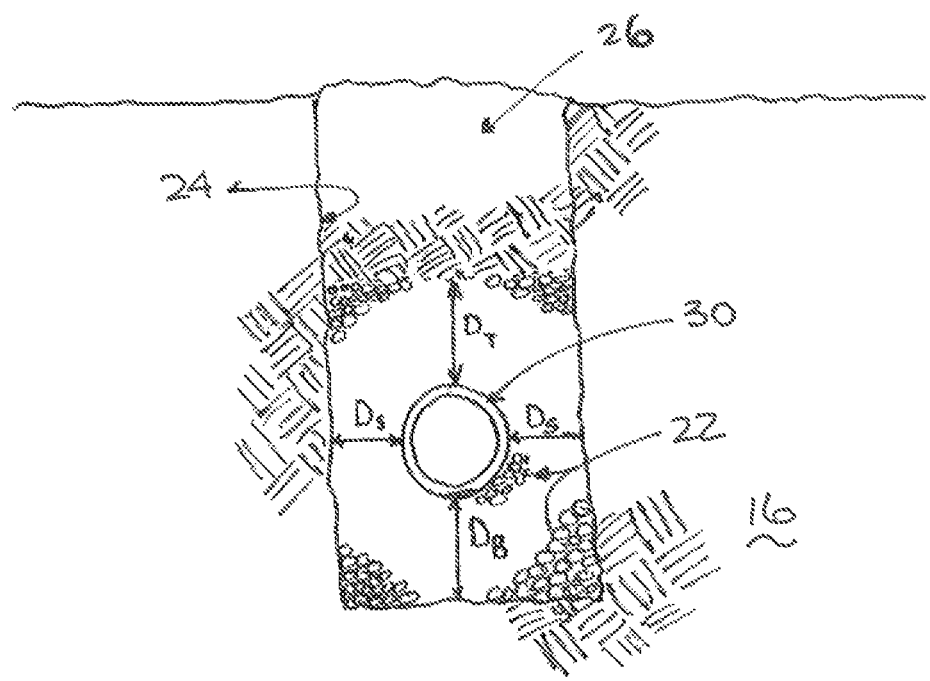
FIG. 8 is a cross-sectional illustration of use of the composite particles to protect a pipeline from seismic damage.

To support an entrenched pipeline, for example, a bed of composite particles is installed under and around the pipeline as shown in FIG. 8. First a trench 24 is dug or cut into the existing soil, 16. Composite particles 22 may be placed in the trench 24 before the pipeline, or, since it is placed in dry form, the particles 22 can "flow" around and under a pre-installed pipe 30, filling voids and inconsistencies in the surrounding substrate 16. From the outer diameter of the pipe 30, there will be distances to the existing soil 16 in three directions, for example a distance $D_B$ to the bottom of the trench, and two side distances $D_S$ to the sides of the trench wall. Pipe is generally laid in the middle of the trench so $D_S$ is typically equal on each side, but minor deviations in this do not affect the invention. There is a further distance $D_T$ from the top of the pipe 30 to the top of the composite particle layer, where earthen backfill 26 may finish leveling the trench with the existing terrain. When the trench is topped up with local backfill, local soils should not be mixed with the composite particles within the trench itself. In contrast to conventional thin layers of leveling and sealant bedding beneath a pipeline, for best damping effect the thickness of the layer of composite particles should be approximately equal on all sides of the pipeline unless site-specific fault or geological information is available that warrants a thicker layer in a particular direction. In some embodiments $D_B$ may be somewhat thicker that $D_S$. In other embodiments, such as in installations where overloading causes the cyclic strain, $D_T$ maybe thicker than the others, or both $D_T$ and $D_B$ maybe thicker that $D_S$. When design calls for one or more layers to be thicker than the others, the thickness of the thicker layer may exceed the thickness of the thinner layer by about 10%, 20%, 30%, 50% or more.

Furthermore, optimal support and damping effect may be obtained when the cores are made from aggregate of angular or subangular shape and rough surface. For example, in some embodiments, the cores have an angularity number from 5 to 12, or from 7 to 10.

Once hydrated, the sealant layer swells and the material conforms tightly to complex shapes, like trench side walls, bedding material, and the curvature of a pipe. Under heavy-duty pavement installations, and if not wetted by surroundings, AB composite particles should be wetted in place in 1-foot (0.3 m) lifts to initiate hydration and promote early stabilization of the material. Hydration may occur either by direct wetting, or by self-hydration resulting from absorption of pore water from the surrounding soil.

Optionally, a geotextile fabric can be added at the upper boundary of the AB particles (minimum 2-feet (0.6 m) overlap on all sides) to serve as a physical separation layer between the AB particles and the backfill/road base. A reinforced geotextile can be substituted both for physical separation and for further structural stability.

Use of AB composite particles in trench applications around pipelines offers advantages not seen in traditional methods. The pipelines may carry oils, gas, electrical or information cabling, water, sewage or any other material essential to establish the "lifeline" nature of the pipe. Alternatively, the pipeline may carry electrical cables, fiber optics, or data cables; or motor vehicles or pedestrians in the case of a tunnel. The advantageous seismic damping and shear modulus properties are discussed below. These contribute to a more stable support base for the pipeline that is believed to reduce the likelihood of damage resulting from a shear fracture of the pipeline. The particles form a more resilient supporting bed resistant to seismic energy damage, particularly where the pipeline trench must pass through bedrock or other rocky terrain. Composite particles with low permeability is not essential to this particular application, but it may be advantageous in some other installations.

In an alternate, geotechnical use, AB composite particles may be used in support structures variously known as a core trench, cut-off wall, vertical barrier, or containment curtain. These are typically used in installations where a barrier is desired to separate or isolate something that is to be contained. Dams, levees, and berms may be used to isolate ponds, rivers, oceans, lakes or other bodies of water. Similar barriers may be desired around waste containment and environmental remediation sites to retain waste and/or toxins. In each case, the premise is to create a somewhat vertically-oriented hydraulic obstruction to prevent the generally lateral migration of water, waste, or a contaminant.

Conventional geotechnical methods vary but typically involve the excavation of a narrow trench, generally three to eight feet wide, that is keyed into an impermeable native substratum (i.e. clay) to form a continuous barrier. Clayey soils or engineered backfill of low hydraulic conductivity were then placed into the trench to complete the cut-off or curtain. Traditional backfills range from unaltered clayey soils to bentonite-based liquid slurries and grouts to soil-cement-bentonite mixtures, all of which, to varying degrees, can be structurally damaged by seismic forces, creating localized seepage pathways. As demonstrated by the examples by reference to the figures, these soils or soil-cement-bentonite mixtures do not possess the damping effect of the present invention, and bentonite-based liquid slurry typically do not possess the geotechnical strength of the AB, BB, or RB materials.

Again AquaBlok® composite particles may be employed in such a cut-off application with enhanced advantages. The advantageous seismic damping and shear modulus properties are discussed below. FIG. 1 illustrates such a use, and shows a levee or dam 10 containing a body of water or other liquid 12. Seismic, explosive, or overloading forces may create a crack or seam 14 in the existing soil 16 below the dam 10 that allows a flow of liquid to bypass the dam and exit outside the containment wall at opening 18. Once a small flow is established, the containment is compromised as the flow path will generally expand and erode more soil and silt along the path, a failure process known as "piping."

To prevent this during construction, or to remedy this post-construction, a trench or "keyway" 20 is made in the soil of the berm or levee transverse to the flow path, and to a depth that extends at least down to impermeable sublayers. The keyway 20 is filled with AquaBlok® composite particles 22 and hydrated, optionally in layers, to form an impermeable portion of the barrier wall. Soil back fill may be employed at the top of the keyway if desired, but should not be mixed with composite particles. In the context of an earthen dam and similar water barriers, the installation is intended to control surface/basin water and groundwater seepage through and under the existing berm. These cut-off walls may be included either during initial construction of a barrier, or as a post-construction modification. For environmental and waste control applications, a trench may be installed down-gradient of a known contaminant source (e.g. a landfill) to prevent the migration of contaminated water off site or up-gradient of a contaminated zone to prevent the flow of non-contaminated groundwater through the impacted area. Other potential uses of this type of vertical barrier is along the sides of canals or rivers, such as levees, and around ponds or other aquatic basins.

The composite particles may be used in other applications as well that may benefit from damping protection against seismic energy. For example, an abutment that supports a railway or highway bridge may also be susceptible to damage from seismic vibrations resulting from an earthquake or other seismic event, including cyclic loading/unloading caused by repetitive vehicular traffic over the structure. Supporting such structures with composite particles that have a high damping ratio may reduce the chances of seismic damage. Another example is a railway or vehicular route through a tunnel in a rocky, mountainous area. Like a pipeline in rocky area, these tunnels are vulnerable to shear damage resulting from seismic energy waves. The use of high damping ratio supporting particles could minimize this damage.

Without wishing to be bound by any theory or mechanism, it is thought that the improved seismic damping properties of AB-like composite particles may result from one or both of: (1) the angularity of the aggregate that permits a more stable matrix while retaining a relatively high void space, and (2) the residual capacity of the sealant layer to swell or expand beyond the extent of the initial hydration period and fill voids created by strain. Consequently, if a crack or void initially appears in the barrier layer, the residual expansion capacity of the composite particles in the presence of subsequent hydration allows the material to reseal itself to form again an integral barrier layer of low permeability.

EXAMPLES

Example 1: Damping and Shear Modulus by Cyclic Triaxial Apparatus—OSU

Several different samples of composite particles were prepared and tested. The composite particles varied in composition as shown in Table 1, below.

TABLE 1

Composition of AB Sample Composite Particle Formulations

| Sample # | Nomenclature | % Bentonite | % Aggregate | Sieve Size | 50% Material w/ 50% Aggregate |
|---|---|---|---|---|---|
| 1 | 2080FW8 | 20 | 80 | ODOT #8 | N/A |
| 2 | 2080FW9 | 20 | 80 | ODOT #9 | N/A |
| 3 | 3070FW8 | 30 | 70 | ODOT #8 | N/A |
| 4 | 3070FW9 | 30 | 70 | ODOT #9 | N/A |
| 7 | Blended Barrier #8 (3070FW8) | 30 | 70 | ODOT #8 | #8 Aggregate |
| 8 | Blended Barrier #9 (3070FW9) | 30 | 70 | ODOT #9 | #9 Aggregate |

Samples #1 to #4 contained only aggregate cores, a polymeric binder and a sealant layer of bentonite clay coating and thus are considered AB particles as discussed herein. These four samples varied in the weight percent bentonite (20% or 30%) and in the size of the aggregate cores Samples #7 and #8 blended composite particles like those of samples #3 and #4 with similarly sized aggregate in a 50:50 weight blend to form a particle mixture discussed herein as BB particles.

The samples were hydrated and set up for measurement of deviator stress-strain hysteresis loops in manner similar to ASTM Standard D3999-11. After hydration, each sample was subjected to 40 cycles (at 1 Hz) of axial compression strain at each of 5 strain levels: 0.1%, 0.18%, 0.28%, 0.48%, and 0.78% strain at a confining pressure of 6.5 psi (44.8 kPa). Cyclic shear strain was calculated from cyclic axial strain using a Poisson's ratio of 0.3 for unsaturated clay; and the cyclic shear strains corresponding to the listed cyclic axial strains are 0.13%, 0.23%, 0.36%, 0.62%, and 1.0%, respectively. The middle 10 cycles were captured as stress-strain hysteresis loop plots. From these hysteresis loops, shear modulus (G) was calculated according to the method of Kumar, Krishna, & Dey, 2015 as a measure of the stiffness of AquaBlok® composite particles. The damping ratio (D), the ratio of dissipated energy to stored strain energy, was calculated from the area of the hysteresis curves by the method of Rees (2016) as a measure of ability to absorb energy.

Figure 3A:
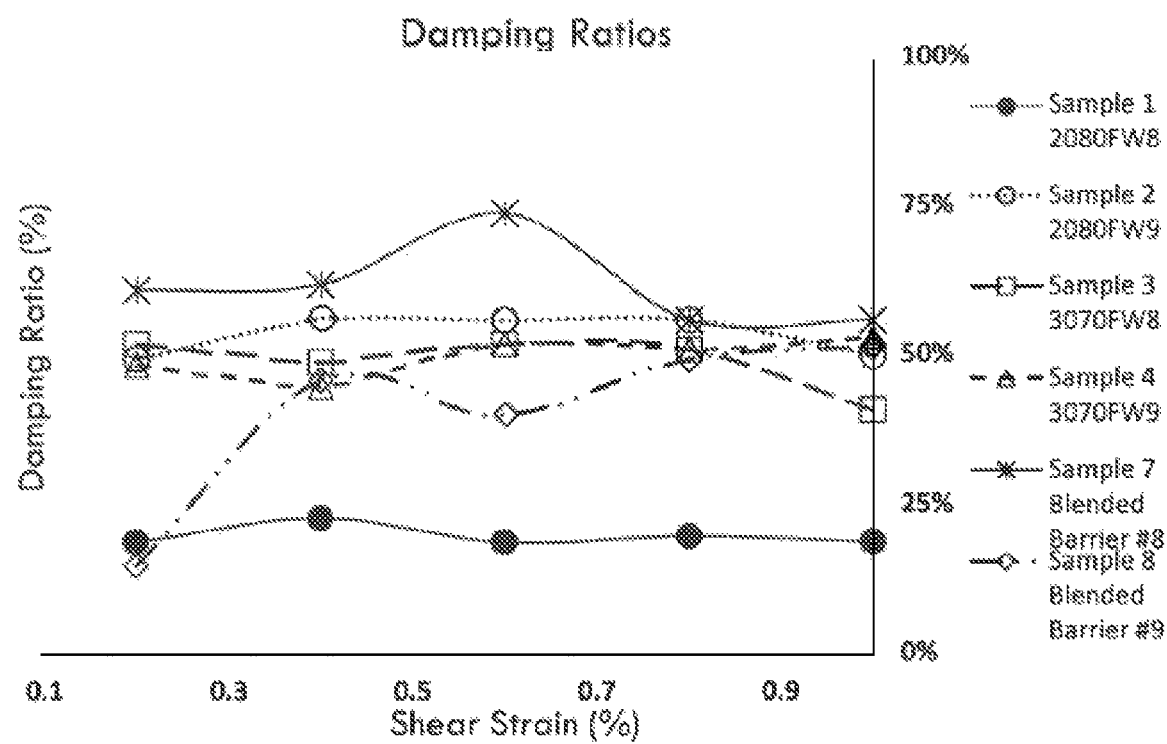
FIGS. 3A and 3B are charts showing damping ratios and shear modulus values for composite particles subjected to strain as in Example 1.
Figure 3B:
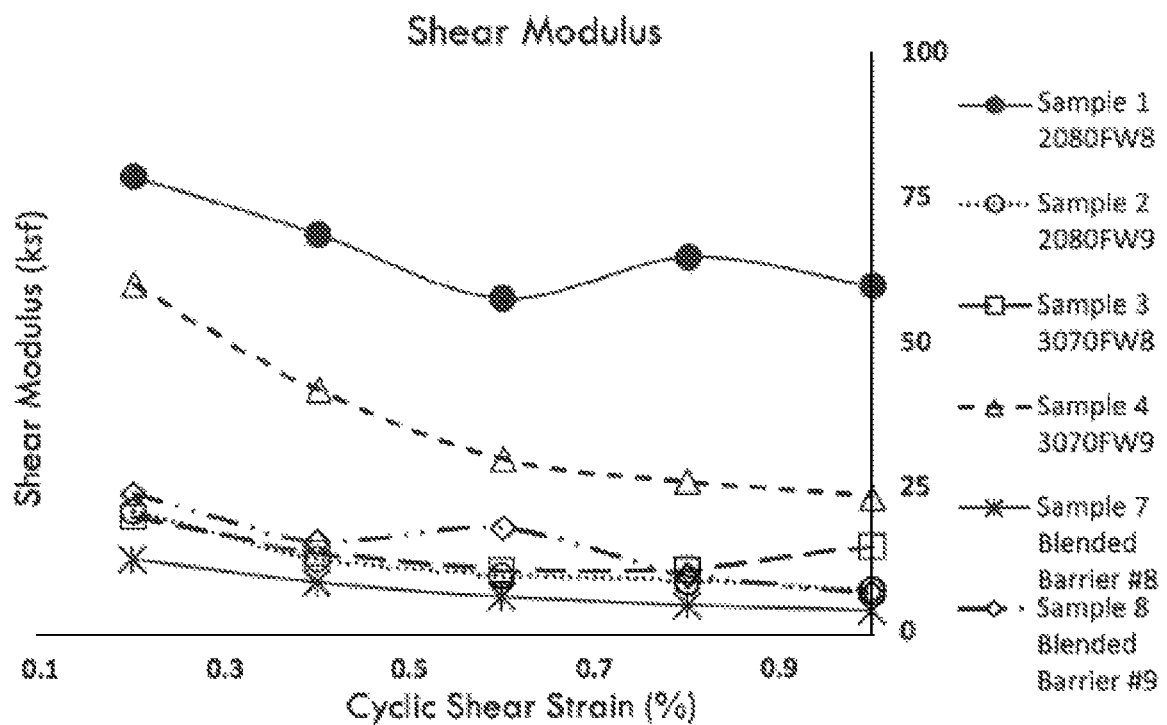

The calculated data for the five samples are plotted in FIG. 3A (damping ratio) and FIG. 3B (shear modulus).

Figure 2B:
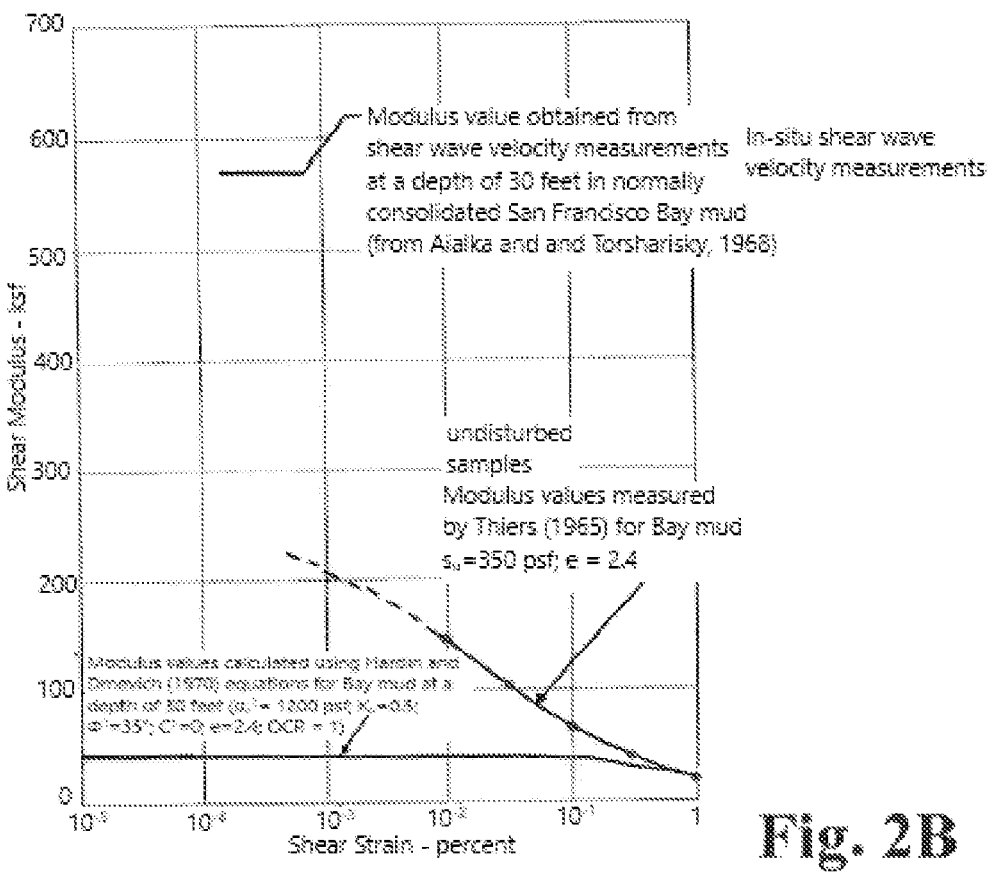

For comparison, the literature was searched for similar parameters of traditional bentonite supporting structures. Seed and Irdiss (1970) published a literature review of modulus and damping ratio data for bentonite clays. These data are reproduced in FIG. 2A (damping ratio) and FIG. 2B (shear modulus). Various authors have reported damping ratios of about 4% to about 20% at a strain of 0.1%, and damping ratios of about 10% to about 27% at a strain of 1.0%, and a trend toward increasing damping ratio with increasing strain. In contrast, the composite particles exhibited damping ratios ranging from about 15% to about 65% at a strain of 0.1%, and ranging from about 20% to about 60% at a strain of 1.0%. The damping ratios remained relatively constant over the range of strains from 0.1% to 1.0%; and with the exception of sample #1, the damping ratios clustered between about 35% and 65%, considerably higher than the damping ratios of clayey soils alone from the literature.

Shear modulus (ksf=kilopounds per square foot) is a measure of stiffness. As shown in the lower right portion of FIG. 2B, the shear modulus of clayey mud from San Francisco Bay ranges from about 40 to 66 ksf (2107 to 3160 kPa) at strain of 0.1% and was about 20 ksf (957.6 kPa) at 1.0% strain, with a trend of decreasing stiffness with higher strain. Comparing these data to the data of FIG. 3B, shows that the composite particles exhibited similar stiffness (as shear modulus) and also a decreasing trend with higher strain.

Example 2: Damping and Shear Modulus by Resonant Column Apparatus—GT

Three different samples of composite particles were prepared and tested. The composite particles varied in composition as shown in Table 2, below.

TABLE 2

Composition of AquaBlok ® Sample Composite Particle Formulations

| Sample # | % Bentonite | % Aggregate | Sieve Size | Shear Strain Range |
|---|---|---|---|---|
| 10 | 1585-8 | 15 | 85 | ODOT #8 | 7.5 E-5 to 1.22% |
| 11 | 2080-8 | 20 | 80 | ODOT #8 | 1.4 E-5 to 2.043% |
| 12 | 3070-8 | 30 | 70 | ODOT #8 | 2.33 E-4 to 4.94% |

Figure 4A:
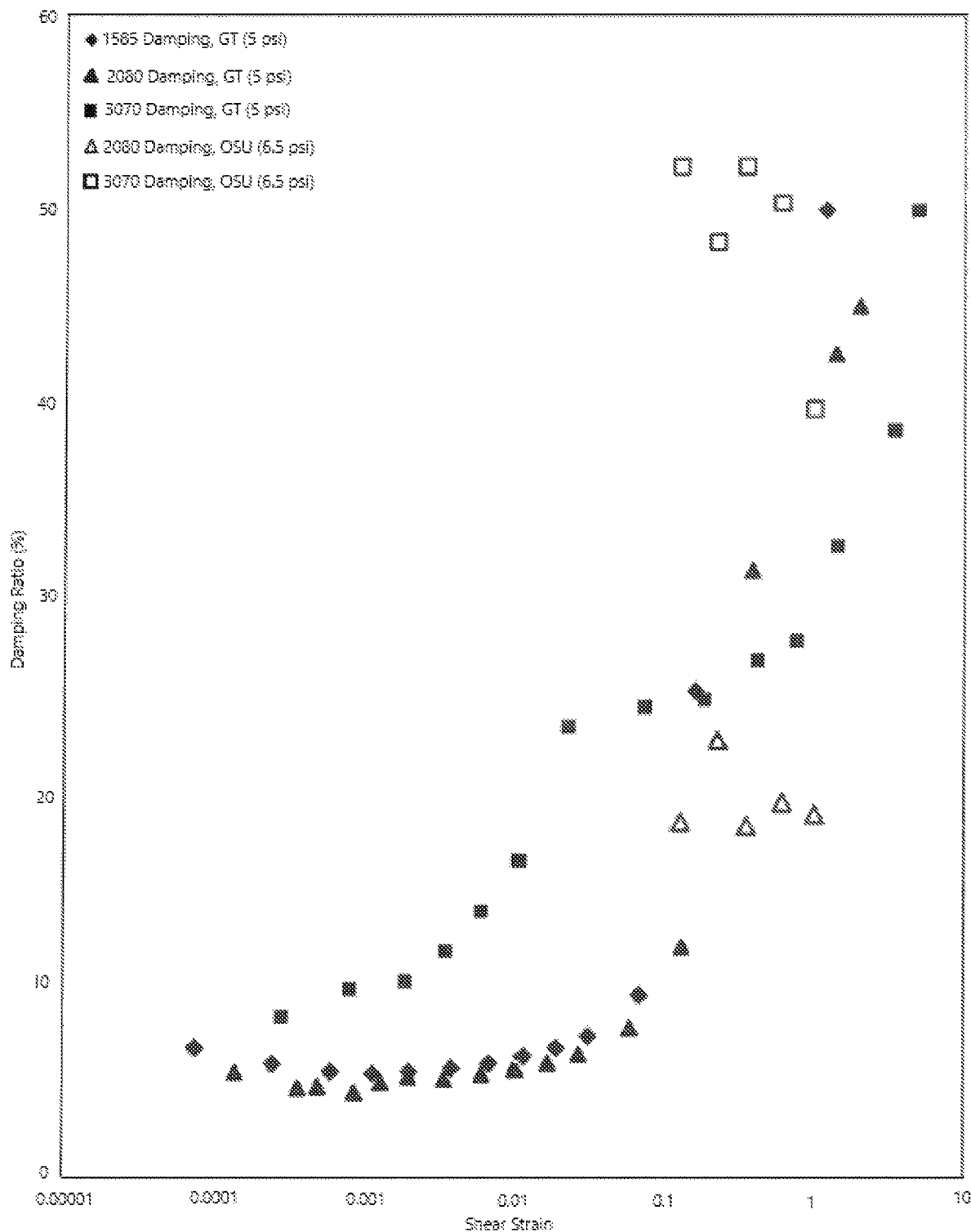
FIGS. 4A and 4B are charts showing damping ratios and shear modulus values for composite particles subjected to strain as in Example 2.
Figure 4B:
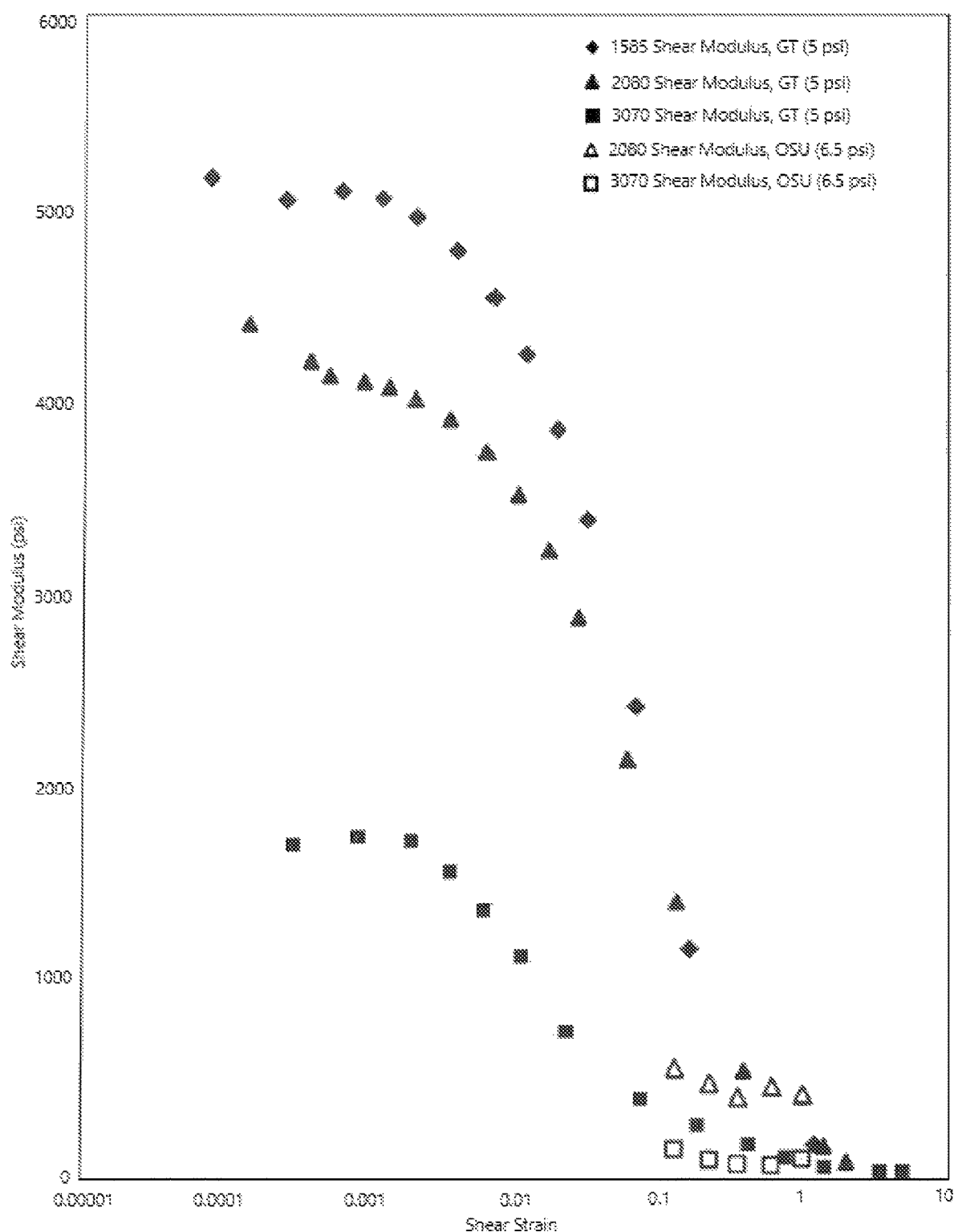

The samples were hydrated and set up for measurement of stress-strain in accordance with ASTM Standard D4015 at confining pressures of 5, 25, and 50 psi (34.5, 172.4, and 344.7 kPa). Confining pressure correlates to the weight of overloading soil, so that higher pressures mimic deeper installations. Shear strain ranges varied for each sample as given in Table 2 and, compared to Example 1, the strains were considerably more varied over a much greater range (especially lower strains, but also higher strains), which is more representative of strains caused by seismic events. The shear modulus and damping ratio were calculated for each strain level and confining pressure. Selected data from Example 2 are plotted along with similar data from Example 1 in FIGS. 4A and 4B. Data points identified as GT are from Example 2, while data points identified as OSU are from Example 1. The data shows good correlation between the two different testing methodologies and two different laboratories.

Figure 5A:
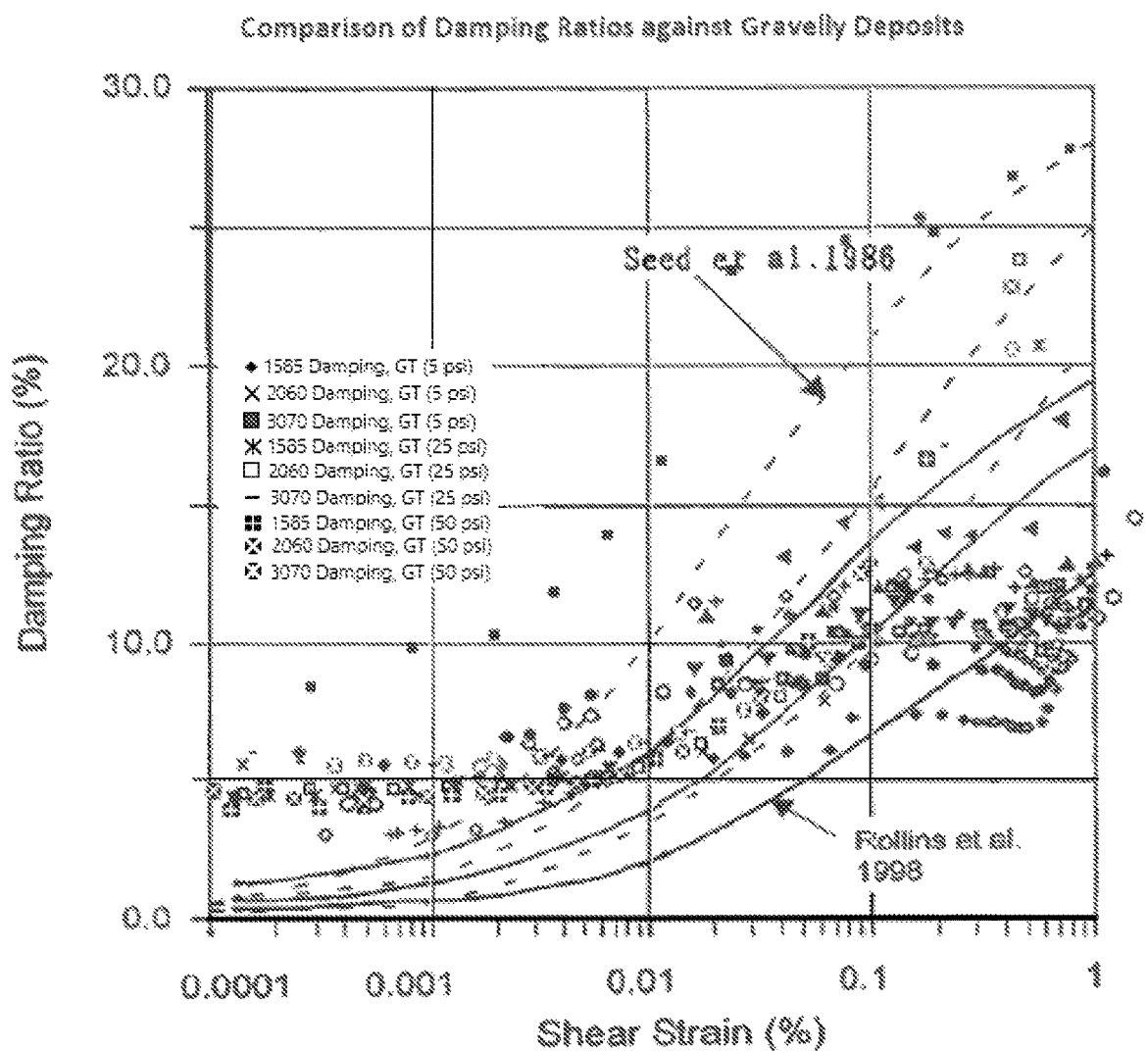
FIGS. 5A to 5C are charts showing damping ratio data from Example 2 overlaid with some literature values for various soil types representative of pipeline bedding materials, as in FIG. 2A.
Figure 5B:
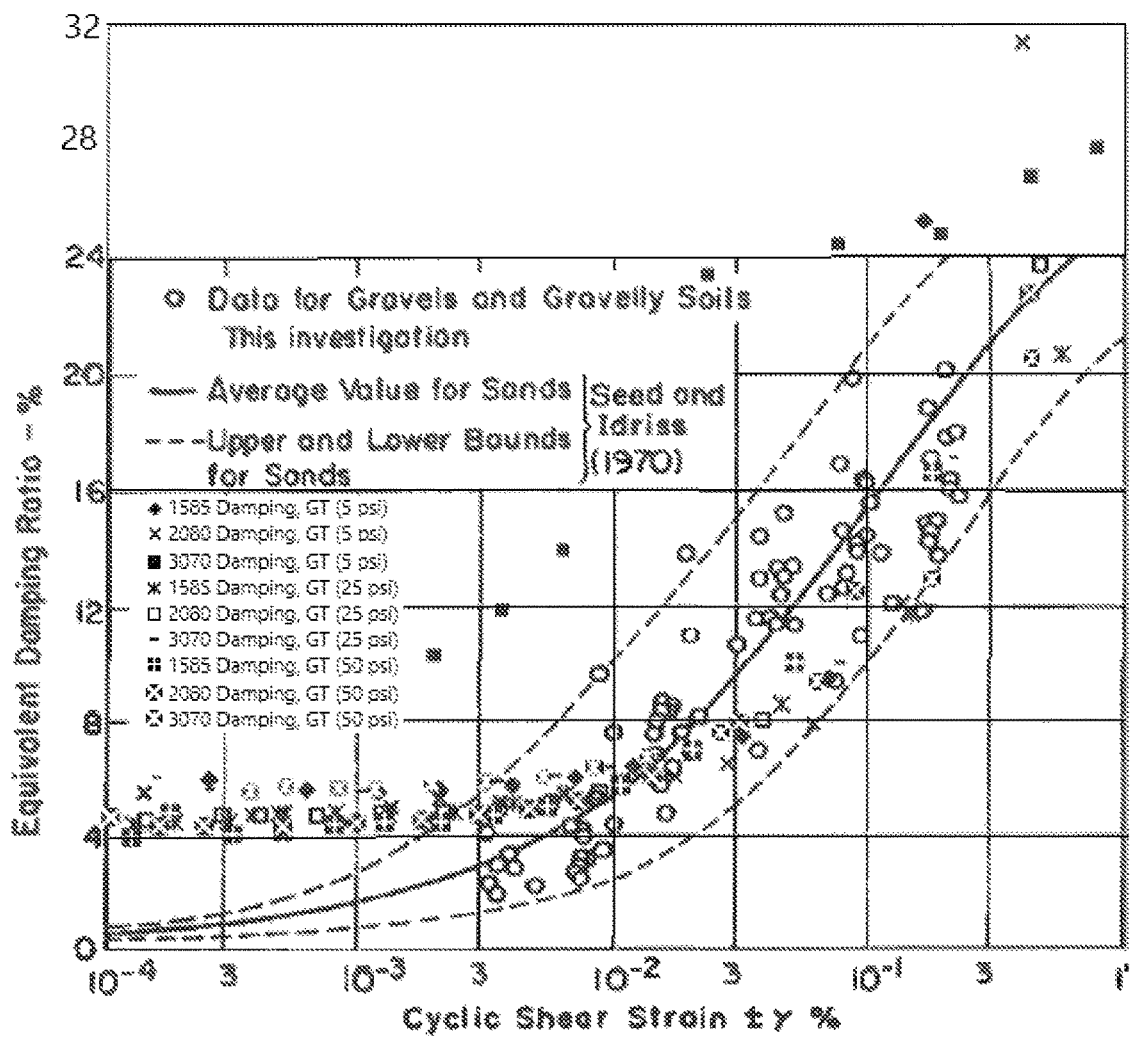
Figure 5C:
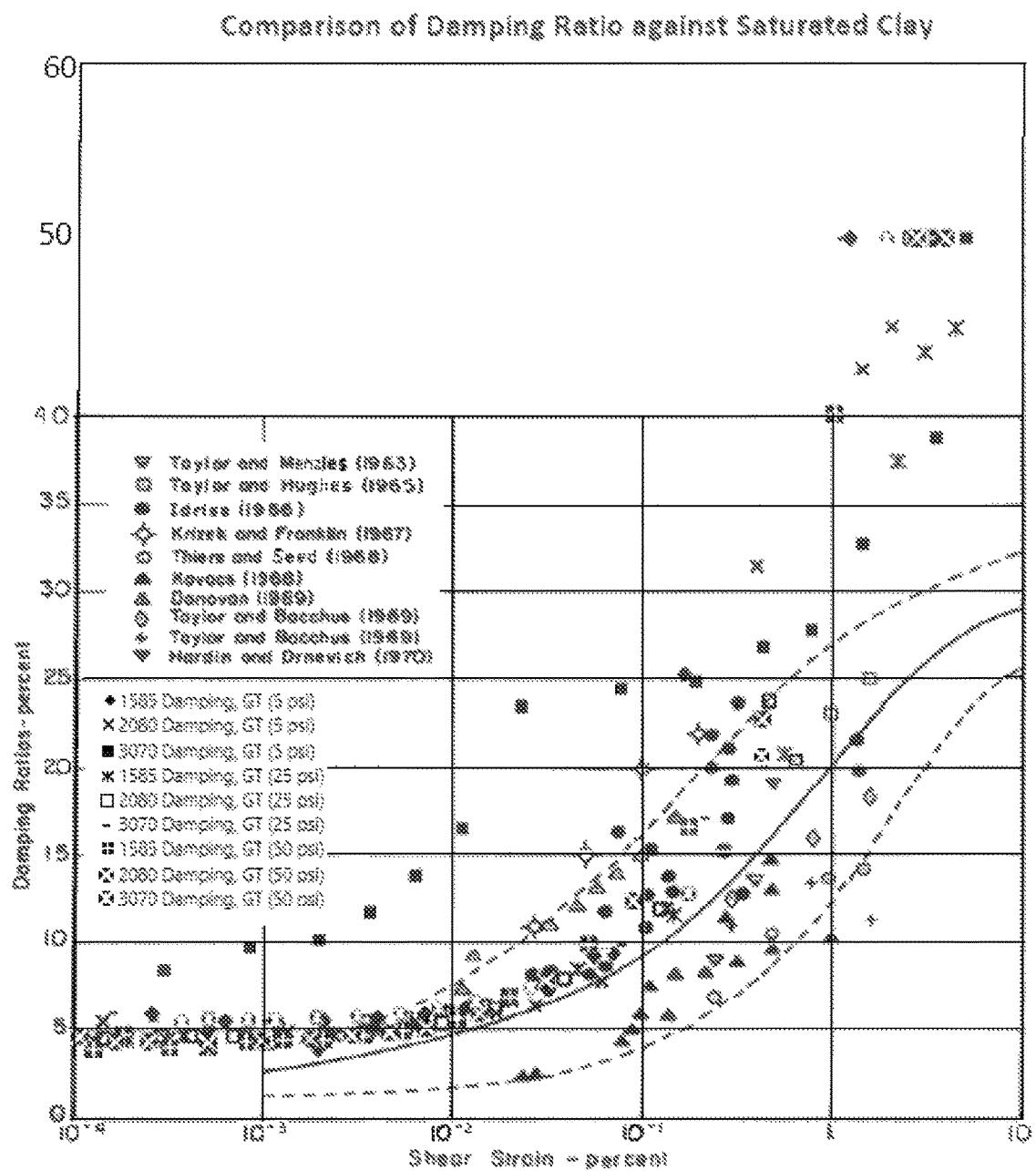
Figure 6:
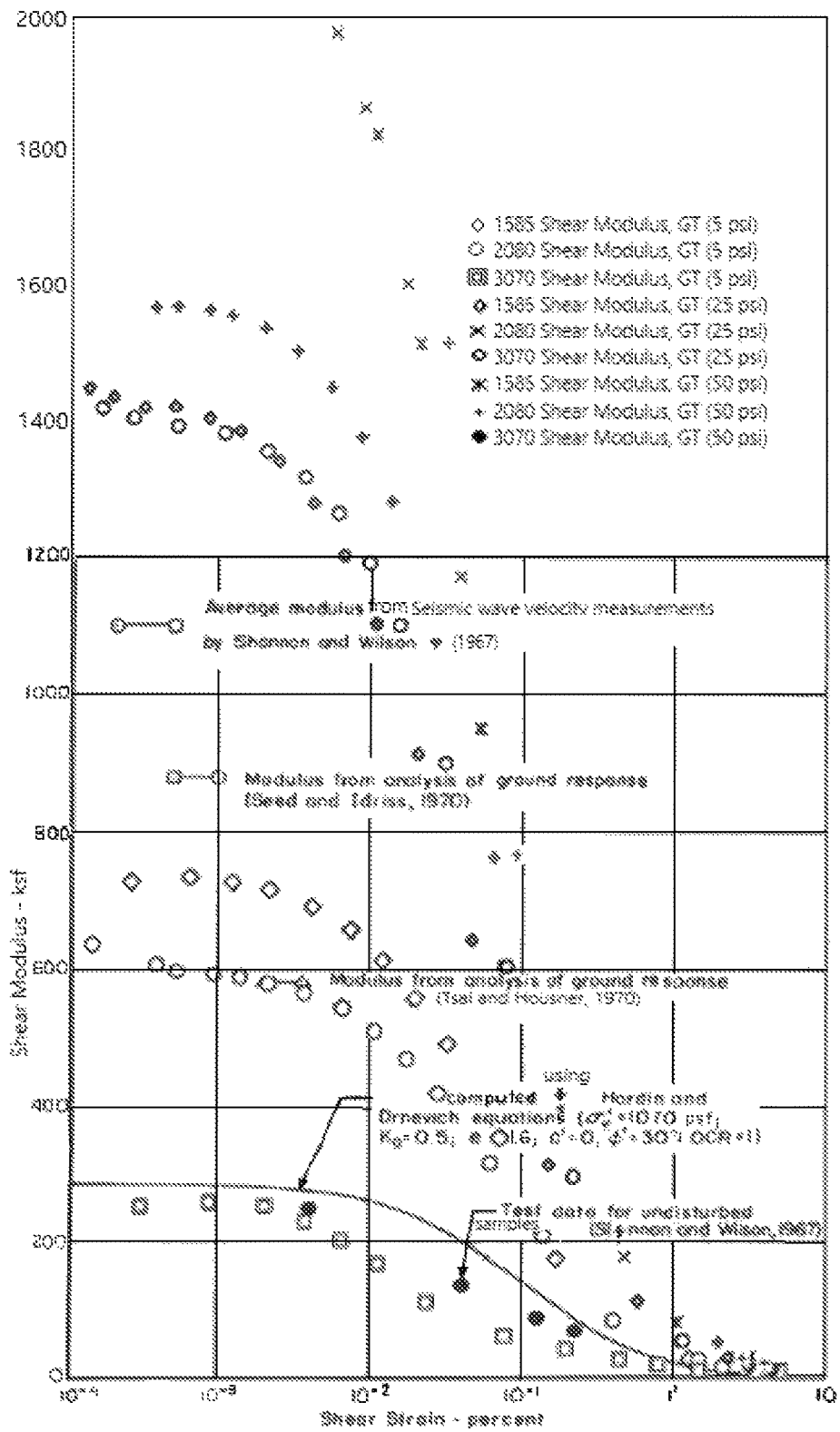
FIG. 6 is a chart showing shear modulus data from Example 2 overlaid with some literature values for clayey soil types representative of dam or levee construction materials, as in FIG. 2B.

As in Example 1, the data for damping ratio and shear modulus was compared to literature values for various soils. FIGS. 5A-5C compare the damping ratios of AquaBlok® composite particles with literature values reported for gravelly deposits (5A), gravelly soils and sands (5B), and saturated clays (5C). FIG. 6 compares the shear moduli of AquaBlok® composite particles with literature values reported for Clay Soils. It can be seen that the composite particles generally exhibit higher damping ratios with similar or higher shear moduli, especially at higher confining pressures representative of earthen dams and levees.

Example 3: Hydraulic Conductivity

Three different samples of composite particles were prepared and tested. The composite particles varied in composition as shown in Table 2, above.

Figure 7:
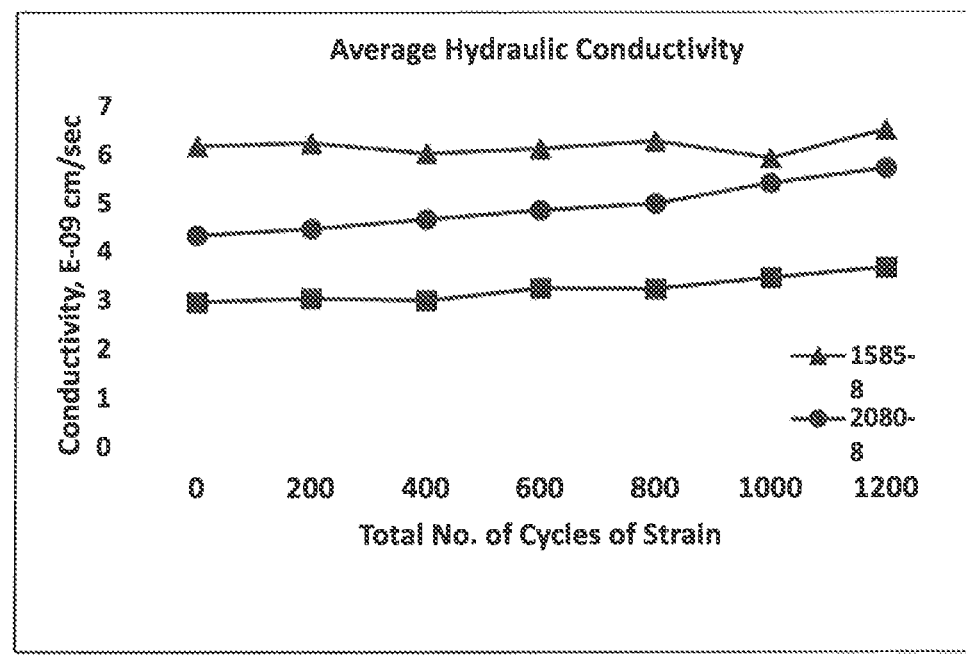
FIG. 7 is a chart showing average hydraulic conductivity composite particles subjected to strain as in Example 3.

Conductivity was measured according to ASTM D5084-16a using a 2.8" diameter split-mold cell. Composite particles were added in layers and hydrated. The cell was then subjected to multiple sets of 0.5 Hz cycles of sinusoidal axial strain as described below, with steady state hydraulic conductivity being measured before any strain, and after each set of strain cycles. The schedule of strain cycle sets was 1200 total cycles, 1% axial strain three sets of 200 cycles followed by 2% axial strain for 3 sets of 200 cycles. Repeated sinusoidal waves of force are considered to be a reasonable model or representation of seismic waves. The data are presented in Table 3 below and in FIG. 7.

TABLE 3

Hydraulic Conductivity*

| | 1% Axial Cyclic Strain | | | | 2% Axial Cyclic Strain | | |
|---|---|---|---|---|---|---|---|
| | 0 Cycles k (cm/s) | 200 Cycles k (cm/s) | 400 Cycles k (cm/s) | 600 Cycles k (cm/s) | 800 Cycles k (cm/s) | 1000 Cycles k (cm/s) | 1200 Cycles k (cm/s) |
| Sample 10: 1585-8 | 6.56E−09 | 6.55E−09 | 6.01E−09 | 6.78E−09 | 7.15E−09 | 5.65E−09 | 7.05E−09 |
| | 6.09E−09 | 6.51E−09 | 6.32E−09 | 5.76E−09 | 6.17E−09 | 5.65E−09 | 6.27E−09 |
| | 6.13E−09 | 5.57E−09 | 6.08E−09 | 6.40E−09 | 5.19E−09 | 6.52E−09 | 6.30E−09 |
| | 5.93E−09 | 6.32E−09 | 5.72E−09 | 5.59E−09 | 6.60E−09 | 5.89E−09 | 6.40E−09 |
| Average | 6.18E−09 | 6.24E−09 | 6.03E−09 | 6.13E−09 | 6.28E−09 | 5.93E−09 | 6.51E−09 |
| Sample 11: 2080-8 | 4.01E−09 | 4.97E−09 | 4.37E−09 | 4.68E−09 | 4.58E−09 | 6.48E−09 | 6.93E−09 |
| | 4.65E−09 | 4.66E−09 | 4.99E−09 | 5.38E−09 | 5.08E−09 | 5.12E−09 | 5.10E−09 |
| | 4.34E−09 | 4.44E−09 | 4.53E−09 | 4.15E−09 | 5.06E−09 | 5.67E−09 | 5.47E−09 |
| | 4.38E−09 | 3.83E−09 | 4.77E−09 | 5.24E−09 | 5.24E−09 | 4.38E−09 | 5.39E−09 |
| Average | 4.34E−09 | 4.47E−09 | 4.67E−09 | 4.86E−09 | 4.99E−09 | 5.41E−09 | 5.72E−09 |
| Sample 12: 3070-8 | 3.06E−09 | 3.08E−09 | 3.09E−09 | 3.26E−09 | 3.27E−09 | 3.50E−09 | 4.24E−09 |
| | 2.87E−09 | 3.36E−09 | 2.57E−09 | 3.64E−09 | 3.55E−09 | 3.56E−09 | 3.94E−09 |
| | 3.14E−09 | 3.32E−09 | 3.69E−09 | 3.51E−09 | 3.06E−09 | 3.33E−09 | 3.23E−09 |
| | 2.80E−09 | 2.41E−09 | 2.66E−09 | 2.60E−09 | 3.09E−09 | 3.44E−09 | 3.27E−09 |
| Average | 2.97E−09 | 3.04E−09 | 3.00E−09 | 3.25E−09 | 3.24E−09 | 3.46E−09 | 3.67E−09 |

Note:
"E−09" refers to conventional exponential nomenclature, i.e. $\times 10^{-9}$ From the data it can be seen that the hydraulic conductivity or permeability started out very low for all three test formulations in the 10-9 range. As expected, the highest bentonite formulation (3070-8) was the least permeable at about 3×10-9, and the leanest formulation (1585-8) was the most permeable at about 6×10-9. For all formulations, the conductivity increased only modestly upon exposure to the strain cycles—even as high at 2% strain, but retained the low conductivity of the initial particles. Visual inspection of the block of hydrated composite particles post-stress revealed that bentonite in all samples appeared to have swelled and filled the void spaces which were observed during preparation of the specimen. The overall height of the block changed very little with stress.

The principle and mode of operation of this invention have been explained and illustrated with respect to various exemplary embodiments. Of course, this invention may be practiced otherwise than as specifically explained and illustrated herein without departing from its spirit or scope. Accordingly, numerous modifications and variations on the present invention are obviously possible in light of the disclosure and thus the present invention may be practiced otherwise than as specifically described herein without departing from the spirit and scope of the present invention. Therefore, the foregoing disclosure is merely illustrative of various exemplary aspects of the present invention and numerous modifications and variations can be readily made by skilled artisans that fall within the scope of the accompanying disclosure.

REFERENCES

ASTM Standard D3999, "Standard Tests Methods for the Determination of the Modulus and Damping Properties of Soils Using the Cyclic Triaxial Apparatus," ASTM International, West Conshohocken, Pa., 2013, DOI: 10.1520/D3999-11.

Kumar, S. S., Krishna, A. M., & Dey, A. (2015, Dec. 29). Cyclic Response of Sand Using Stress Controlled Cyclic Triaxial Tests. Paper presented at the 50th Indian Geotechnical Conference. https://www.researchgate.net/publication/288579

Rees, S. (2016, June). Part three: Dynamic triaxial testing. Retrieved from http://www.gdsinstruments.com Seed, H. B. & Idriss, I. M. (1970). Soil moduli and damping factors for dynamic response analyses. Berkeley, Calif.: University of California.

Lin, S.-Y., Lin, P. S., Luo, H.-S., and Juang, C. (2011) Shear modulus and damping ratio characteristics. Canadian Geotechnical Journal, 638-651.

What is claimed is:

1. A method of protecting a lifeline structure from damage caused by seismic waves, the method comprising:
    providing a plurality of composite particles, the composite particles having a hard core at least partially coated with a sealant layer of hydratable clay material that swells upon hydration, wherein the core comprises a first aggregate having an angularity number ranging from 5 to 12,
    using a blend of the composite particles and a second aggregate having a similar size to the first aggregate to protect the lifeline structure from damage caused by seismic waves by one or more of (1) constructing or modifying the lifeline structure using the blend of composite particles and second aggregate integrated into the lifeline structure; or (2) supporting the lifeline structure at at least one location using the blend of composite particles and second aggregate; and
    hydrating the hydratable clay material to cause it to swell and seal voids.

2. The method of claim 1 wherein the lifeline structure is a pipeline, and further comprising supporting the pipeline at a plurality of locations with a base made of the blend of composite particles and second aggregate.

3. The method of claim 1 wherein the lifeline structure is a dam, berm, or levee retaining a body of water or other material subject to liquification from seismic forces, and further comprising constructing or modifying the dam, berm, or levee to include a cut-off wall or keyway comprising the composite particles.

4. The method of claim 1 wherein the damping ratio of the hydrated composite particles is from about 20% to about 65% at 0.1% strain.

5. The method of claim 1 wherein the damping ratio of the hydrated composite particles is from about 35% to about 60% at 1.0% strain.

6. The method of claim 1 wherein the shear modulus stiffness of the hydrated composite particles is from about 15 ksf (718 kPa) to about 60 ksf (2872 kPa) at 0.1% strain.

7. The method of claim 1 wherein the composite particles have a hydraulic conductivity of $1 \times 10^{-6}$ cm/sec or less and maintain a hydraulic conductivity of $1 \times 10^{-6}$ cm/sec or less after being subjected to 1% strain.

8. The method of claim 1, wherein the first aggregate has an angularity number ranging from 7 to 10.

9. The method of claim 1, wherein the structure is a dam, berm, or levee, and the method comprises making a keyway in soil beneath the dam, berm, or levee that extends at least down to impermeable sublayers, filling the keyway with the composite particles, and hydrating the composite particles to form an impermeable portion of a barrier wall.

10. A method of protecting a dam, berm, or levee retaining a body of water or other material subject to liquification from damage due to seismic forces, the method comprising:

constructing or modifying the dam, berm, or levee to include a cut-off wall or keyway comprising the composite particles, the composite particles having a hard core at least partially coated with a sealant layer of hydratable clay material that swells upon hydration, wherein the core comprises an aggregate having an angularity number ranging from 5 to 12; and hydrating the hydratable clay material to cause the hydratable clay material to swell and seal voids, wherein the hydrated composite particles have a hydraulic conductivity of $1 \times 10^{-6}$ cm/sec or less and maintain a hydraulic conductivity of $1 \times 10^{-6}$ cm/sec or less after being subjected to 1% strain;

wherein the cut-off wall or keyway is in soil beneath the dam, berm, or levee and extends at least down to impermeable sublayers.

11. The method of claim 10 wherein the damping ratio of the hydrated composite particles is from about 20% to about 65% at 0.1% strain.

12. The method of claim 10 wherein the damping ratio of the hydrated composite particles is from about 35% to about 65% at 1.0% strain.

13. The method of claim 10 wherein the shear modulus stiffness of the hydrated composite particles is from about 15 ksf (718 kPa) to about 60 ksf (2872 kPa) at 0.1% strain.

14. The method of claim 10, wherein the core comprises an aggregate having an angularity number ranging from 7 to 10.

\* \* \* \* \*